United States Patent [19]
Xie et al.

[11] Patent Number: 5,709,600
[45] Date of Patent: Jan. 20, 1998

[54] METHOD AND MEANS FOR LINKING AND THEN SEPARATING ENCASED SAUSAGE

[75] Inventors: Liansuo Xie, Ankeny, Iowa; Theo R. Bruinsma, Alphen aan de Rijn, Netherlands; David L. McClung, Des Moines, Iowa

[73] Assignee: Townsend Engineering Company, Des Moines, Iowa

[21] Appl. No.: 623,339

[22] Filed: Mar. 27, 1996

[51] Int. Cl.$^6$ .................................................. A22C 11/00
[52] U.S. Cl. ............................... 452/49; 452/46; 452/47
[58] Field of Search ............................. 452/46, 47, 48, 452/49

[56] References Cited

U.S. PATENT DOCUMENTS

| | | |
|---|---|---|
| 3,073,039 | 1/1963 | Muller et al. . |
| 3,435,482 | 4/1969 | Ziolko . |
| 4,463,477 | 8/1984 | Ziolko ................... 452/49 |
| 4,905,349 | 3/1990 | Townsend ............... 452/47 |
| 4,959,888 | 10/1990 | Nerbus et al. . |
| 5,145,450 | 9/1992 | Staudenrausch et al. . |
| 5,145,451 | 9/1992 | Staudenrausch . |
| 5,156,566 | 10/1992 | Righele ................... 452/46 |
| 5,354,228 | 10/1994 | Smith et al. . |

FOREIGN PATENT DOCUMENTS

| | | |
|---|---|---|
| 0069544 | 1/1983 | European Pat. Off. . |
| 503 720 A1 | 3/1992 | European Pat. Off. . |
| 456 155 B1 | 12/1994 | European Pat. Off. . |
| PCT/GB94/ 00794 | 10/1994 | WIPO . |

OTHER PUBLICATIONS

Brochure: "Murin Fouillat"—1989.

Brochure: "Famco Automatic Sausage Linkers: The Industry's Standard"—1989.

Brochure: "Introducing the Butcher's Link to Bigger Profits" Hand Crank Zlinker—1989.

*Primary Examiner*—Willis Little
*Attorney, Agent, or Firm*—Zarley, McKee, Thomte, Voorhees & Sease

[57] ABSTRACT

A linking and link cutting assembly for sausage encasing machines has a pair of endless linking chains having portions which are parallel and which are laterally spaced. They carry spaced pinching blocks which register during the parallel movement, and pinch a sausage rope moving longitudinally therebetween to form links in the rope. A cutting knife is incorporated into one of the registering blocks and is actuated by a cam block having a cam surface that engages the knife to selectively move the knife to cut the desired link. The linking chains are conventionally driven and are adaptable for operative connection to the typical drive shaft of a conventional linking apparatus of a sausage encasing machine. The method of separating cutting links in a sausage rope while the rope is moving longitudinally. The knife which cuts the links is a part of the blocks on the linking chain that forms the links, and is actuated by a cam block. By selectively positioning the cutting knives on the linking chain, two or more sausage members can be linked together if desired.

20 Claims, 7 Drawing Sheets

METHOD AND MEANS FOR LINKING AND THEN SEPARATING ENCASED SAUSAGE

BACKGROUND OF THE INVENTION

Modern encased sausage making machines can produce up to 30,000 sausages or wieners per hour. These machines fill an external tubular casing with meat emulsion. The "sausage rope" created thereby is linked by pinching and twisting the sausage rope at defined intervals, and an elongated strand of sausage members is thereby created. This elongated strand is typically mounted on a special conveyor where the sausage strand is moved for further processing and packaging. Such a strand is subsequently fed through a special link cutting apparatus either associated with the encasing machine or which may be a free standing machine having only link cutting capabilities. Conventional link cutters either must momentarily stop the longitudinal movement of the sausage rope for cutting purposes, or must function under conditions of very slow longitudinal movement so as to make the cutting operation very precise to avoid damaging the finished product. Cutting linked sausage ropes is a slow and expensive process as practiced in the industry.

There are situations where it is desirable to sever a sausage rope only at certain intervals so as to provide that two or more sausage members are linked together. Existing link cutters cannot easily accomplish this desired result. Damaging of the sausage members when the cutting blade is not carefully indexed to sever only the links results in substantial wastage of meat product.

It is therefore a principal object of this invention to provide a sausage linking and cutting assembly which permits the cutting operation to take place while the sausage rope is in continuously longitudinal movement.

A further object of this invention is to permit the cutting of sausage members at the link points without damage to the sausage members themselves.

It is a still further object of this invention to provide a sausage linking and link cutting apparatus and process which will permit two or more sausage members to be linked together.

It is a still further object of this invention to provide a linking and link cutting assembly which can be adapted to the drive mechanism of conventional sausage encasing machines to replace the conventional linking apparatus of those machines.

These and other objects will be apparent to those skilled in the art.

SUMMARY OF THE INVENTION

The method of this invention comprises the separating of linked sausages while they are moving longitudinally from the extruder. The knife which cuts the links is a part of the blocks on the linking chain that forms the links, and is actuated by a cam block. By selectively positioning the cutting knives on the linking chain, two or more sausage members can be linked together if desired.

A pair of endless linking chains have portions which are parallel and which are laterally spaced. They carry spaced pinching blocks which register during the parallel movement, and pinch a sausage rope moving longitudinally therebetween to form links in the rope. A cutting knife is incorporated into one of the registering blocks and is actuated by a cam block having a cam surface that engages the knife to selectively move the knife to cut the desired link.

The linking chains are conventionally driven and are adaptable for operative connection to the typical drive shaft of a conventional linking apparatus of a sausage encasing machine.

DESCRIPTION OF THE PREFERRED EMBODIMENT

Figure 1:
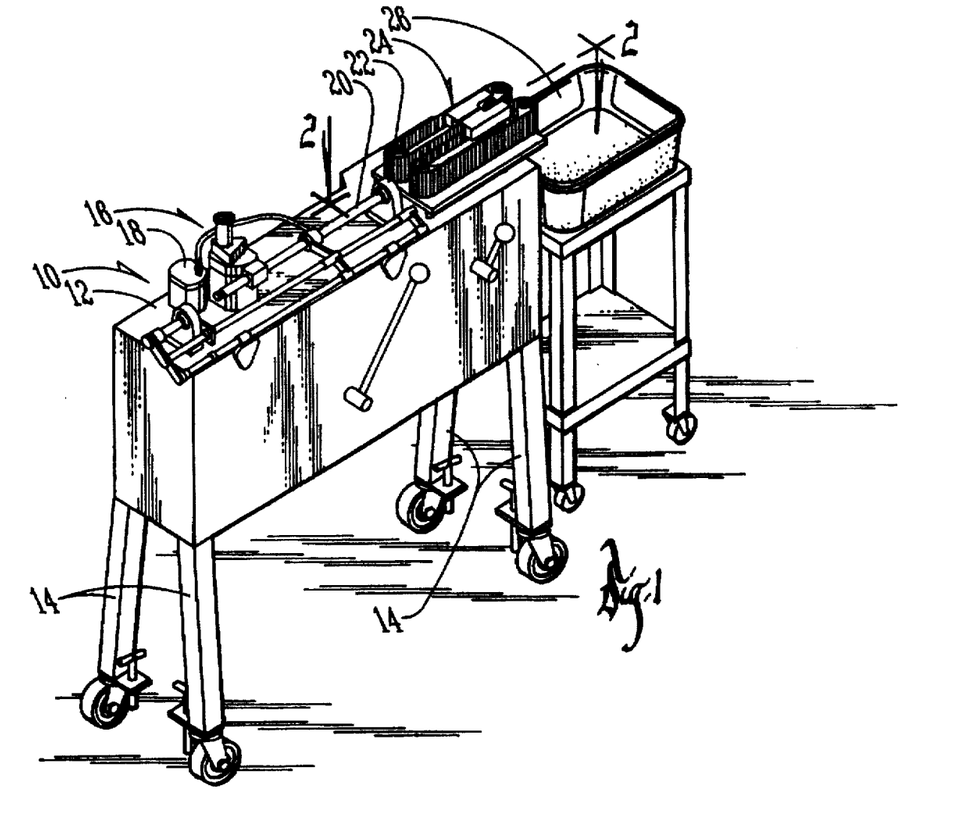
FIG. 1 is a perspective view of a sausage encasing machine utilizing the linking and link cutting device of this invention.

With reference to FIG. 1, the numeral 10 designates a sausage encasing machine having a frame 12, wheeled legs 14 and an extrusion assembly 16. The conventional extrusion assembly 16 includes a meat emulsion pump 18 connected to a source of meat emulsion (not shown). The pump is operatively connected to an elongated stuffing horn 20 which has a downstream end terminating within conventional rotational chuck 22.

A linking and link cutting assembly 24 is located on frame 12 downstream from the chuck 22. Similarly, a conventional sausage receptacle 26 is located downstream from machine 10 to receive link sausages created by the machine.

Figures 9, 10:
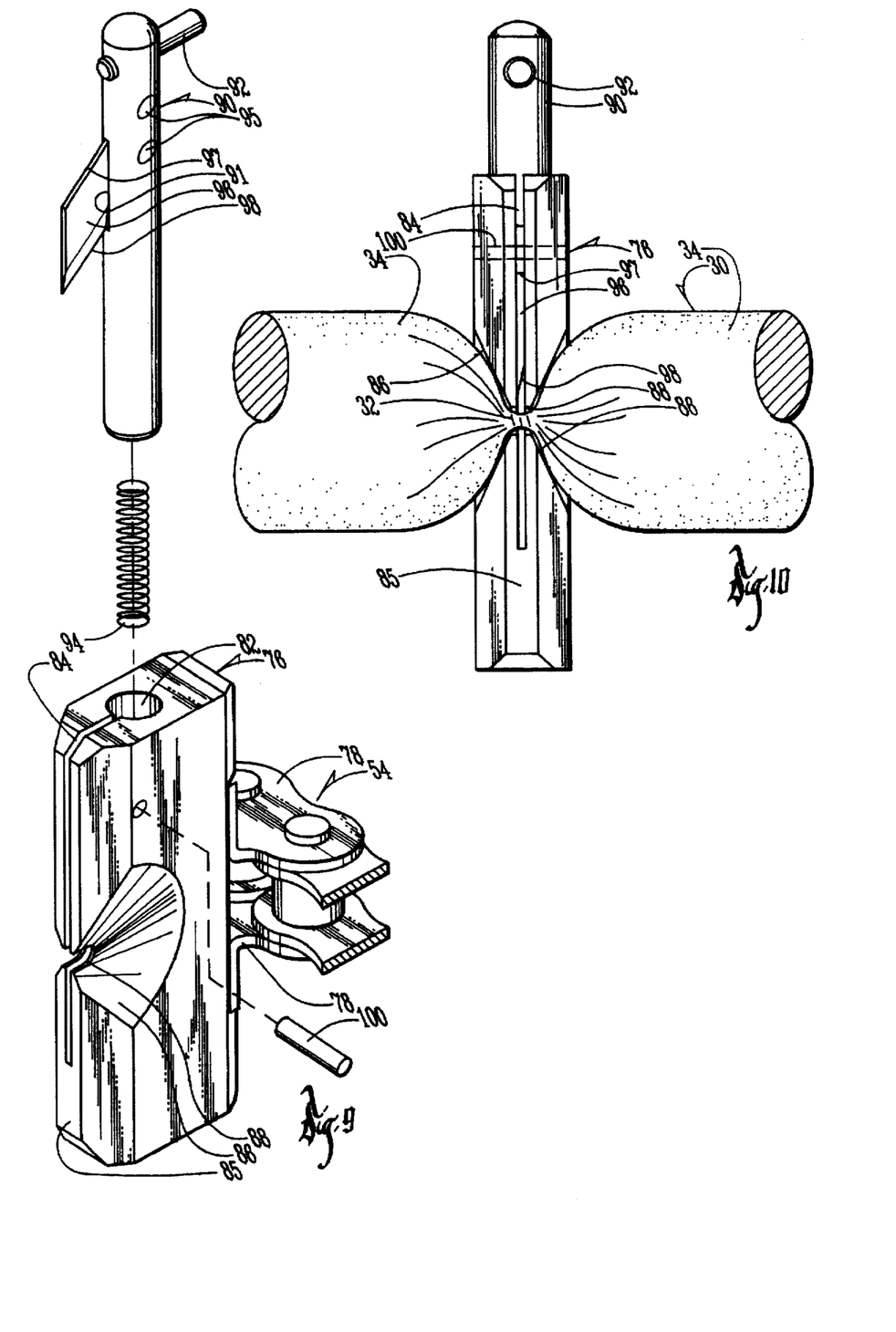
FIG. 9 is an enlarged scale exploded perspective view of the cutting blade and the block in which it is mounted.
FIG. 10 is a large scale elevational view of the assembled cutting blade block with a link sausage rope therein.

Conventional shirred casing 28 (FIGS. 2 and 3) is conventionally mounted on stuffing horn 20 to receive meat emulsion extruded from the interior of horn 20 to create a sausage rope 30. A link 32 (FIG. 10) is formed in rope 30 to create a plurality of sausage members 34. The link 32 is formed, as more fully discussed hereafter, when the sausage rope is pinched after leaving the horn 20 and the rotational motion of the sausage rope imparted by chuck 22 is thereby stopped. The twists created by this phenomenon are shown in FIG. 10 and comprise the link 32.

Figures 2, 3:
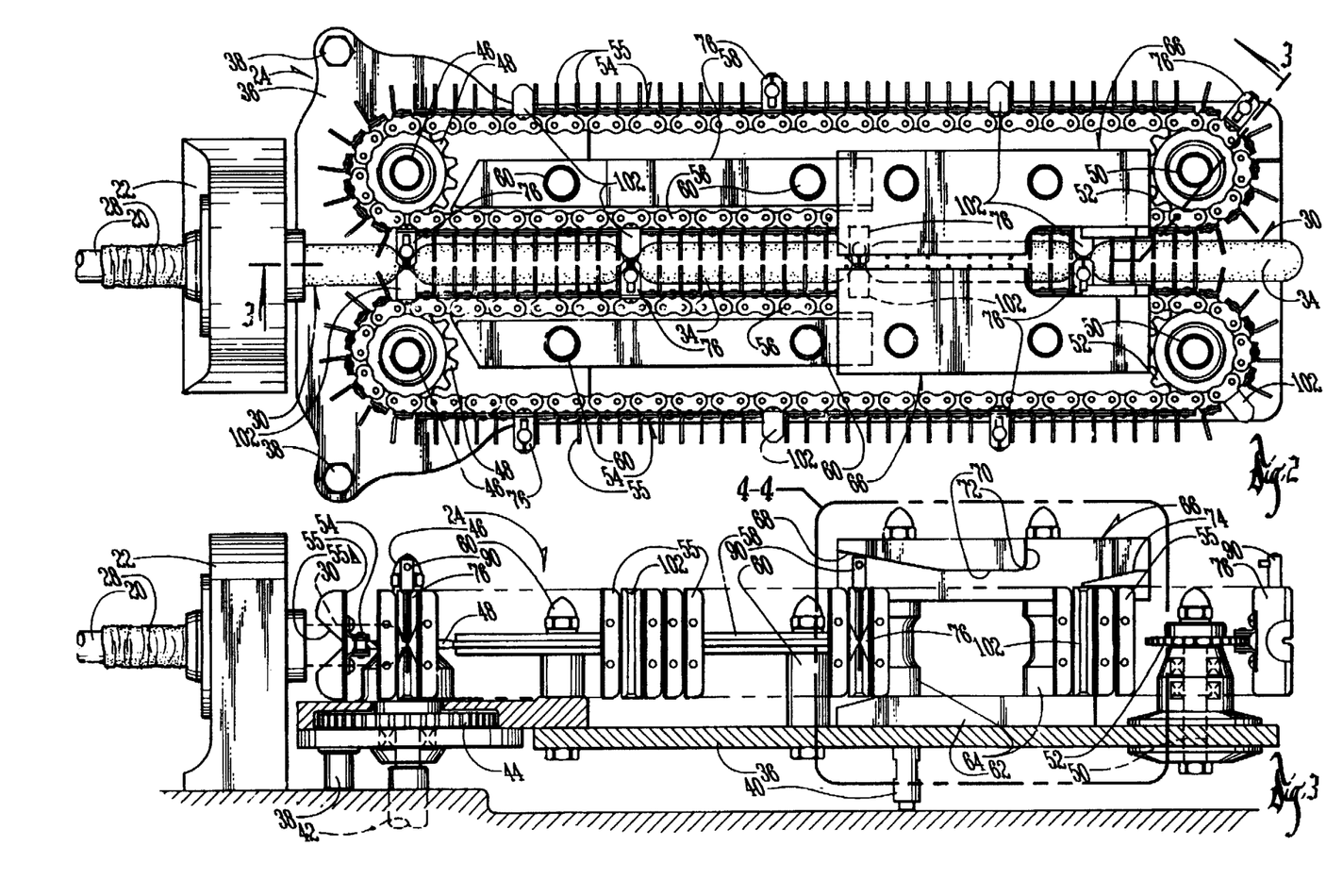
FIG. 2 is an enlarged scale plan view of the linking and link cutting assembly taken on line 2—2 of FIG. 1.
FIG. 3 is a side elevational view of FIG. 2.
Figure 4:
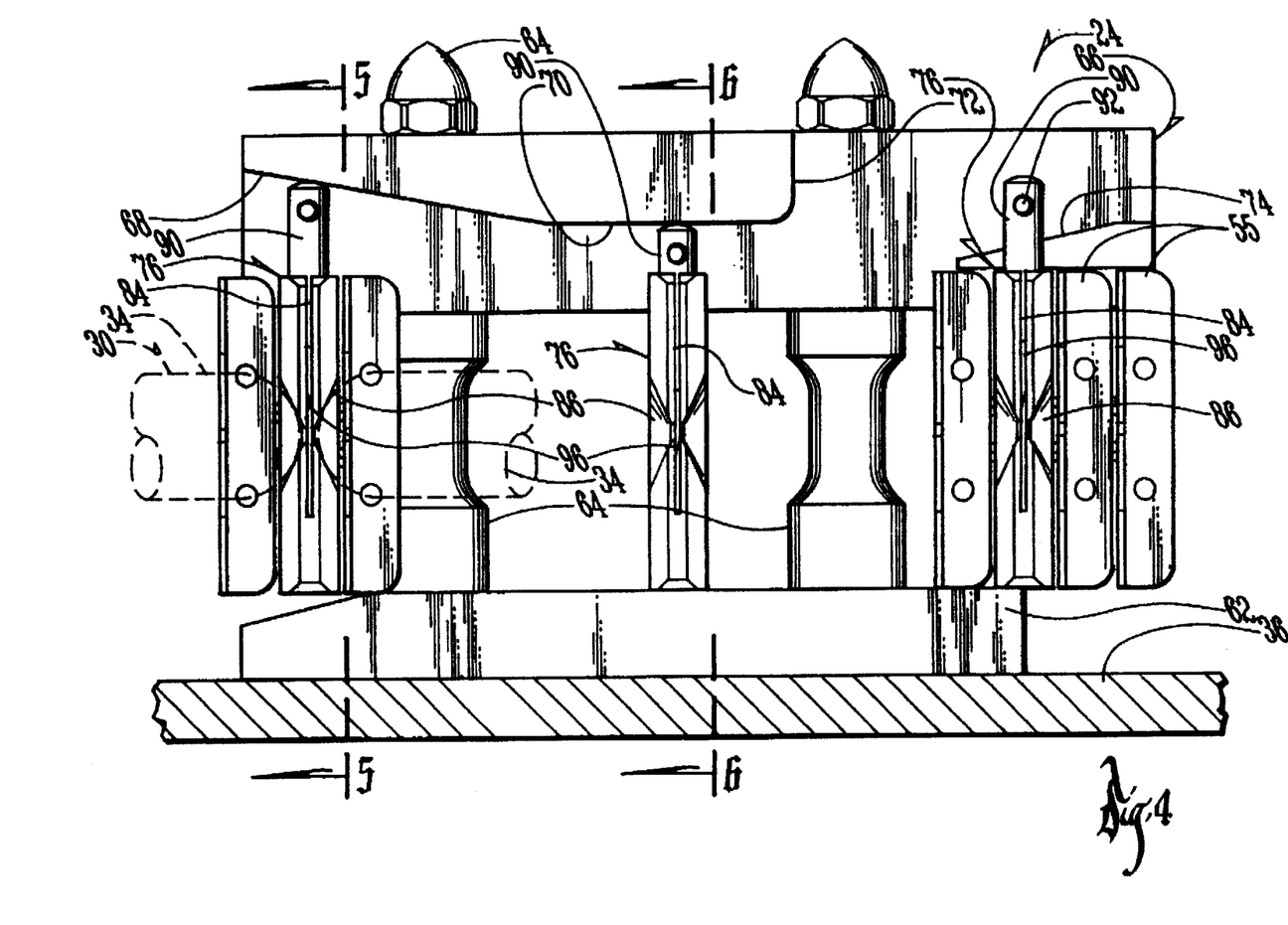
FIG. 4 is an enlarged scale elevational view encompassing line 4—4 of FIG. 3.

With reference to FIGS. 2 and 3, a support plate 36 is secured to frame 10 by means of mounting bolts 38 and 40. A conventional vertical drive shaft 42 extends upwardly from frame 12 and is connected to a source of rotational power (not shown) within the machine 10. If the machine 10 is being converted from a conventional linker assembly to the linker assembly of this invention, the shaft 42 which provided power to the conventional linking assembly is adapted to also provide power to the device of this invention.

Figure 5:
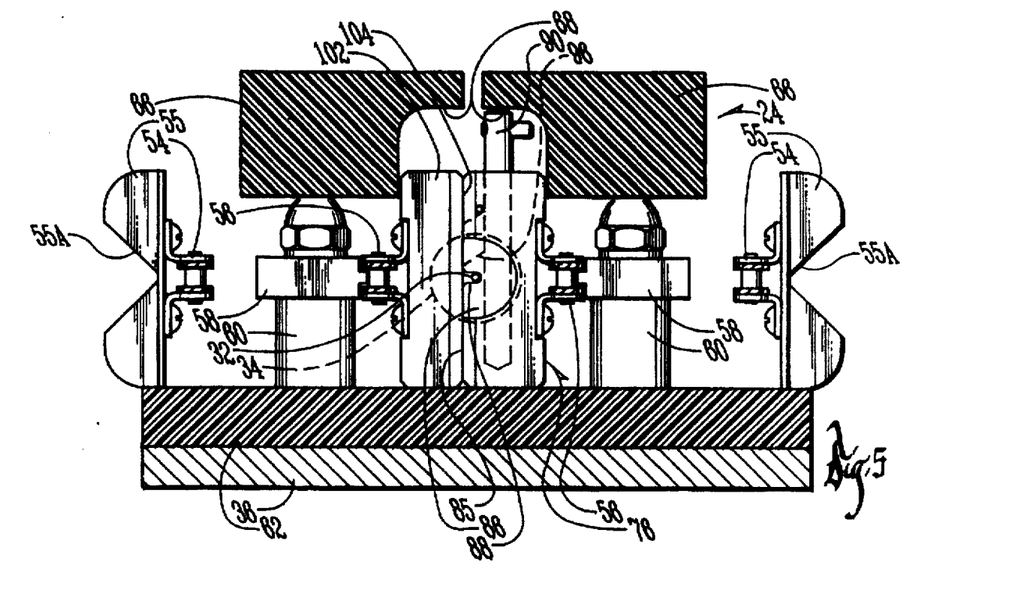
FIG. 5 is an enlarged scale sectional view taken on line 5—5 of FIG. 4.
Figure 6:
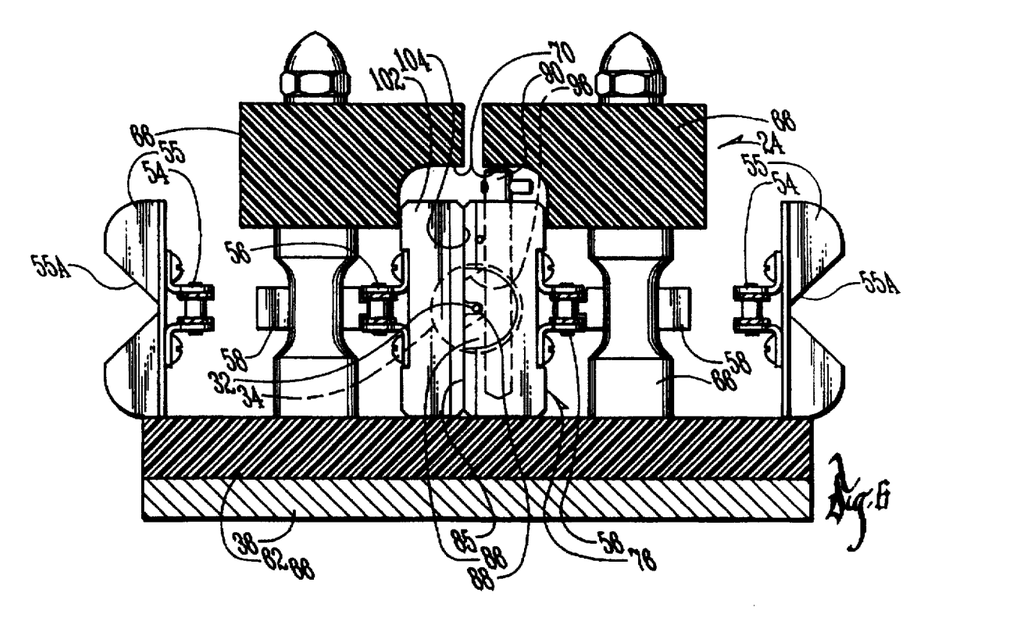
FIG. 6 is a sectional view similar to that of FIG. 5 taken on line 6—6 of FIG. 4.

A gear assembly 44 connects vertical drive shaft 42 to the vertical linker drive shaft 46. A sprocket 48 is mounted on shaft 46. Similarly, idler shafts 50 having idler sprockets 52 similar to sprockets 48 are mounted downstream from the two sprockets 48 shown in FIG. 2. Conventional sprocket linker chains (carrier elements) 54 encircle the pair of gears 48 and 52 as shown in FIG. 2. Each of the chains 54 has an inner portion 56 which is parallel and slightly spaced from the inner portion 56 of the adjacent chain. Con-ventional L-shaped guide clips 55 having V-shaped notches 55A (FIGS. 5 and 6) are secured to chains 54.

Guide blocks 58 are mounted centrally on plate 36 and are supported by posts 60. (FIG. 2)

Figures 7, 8:
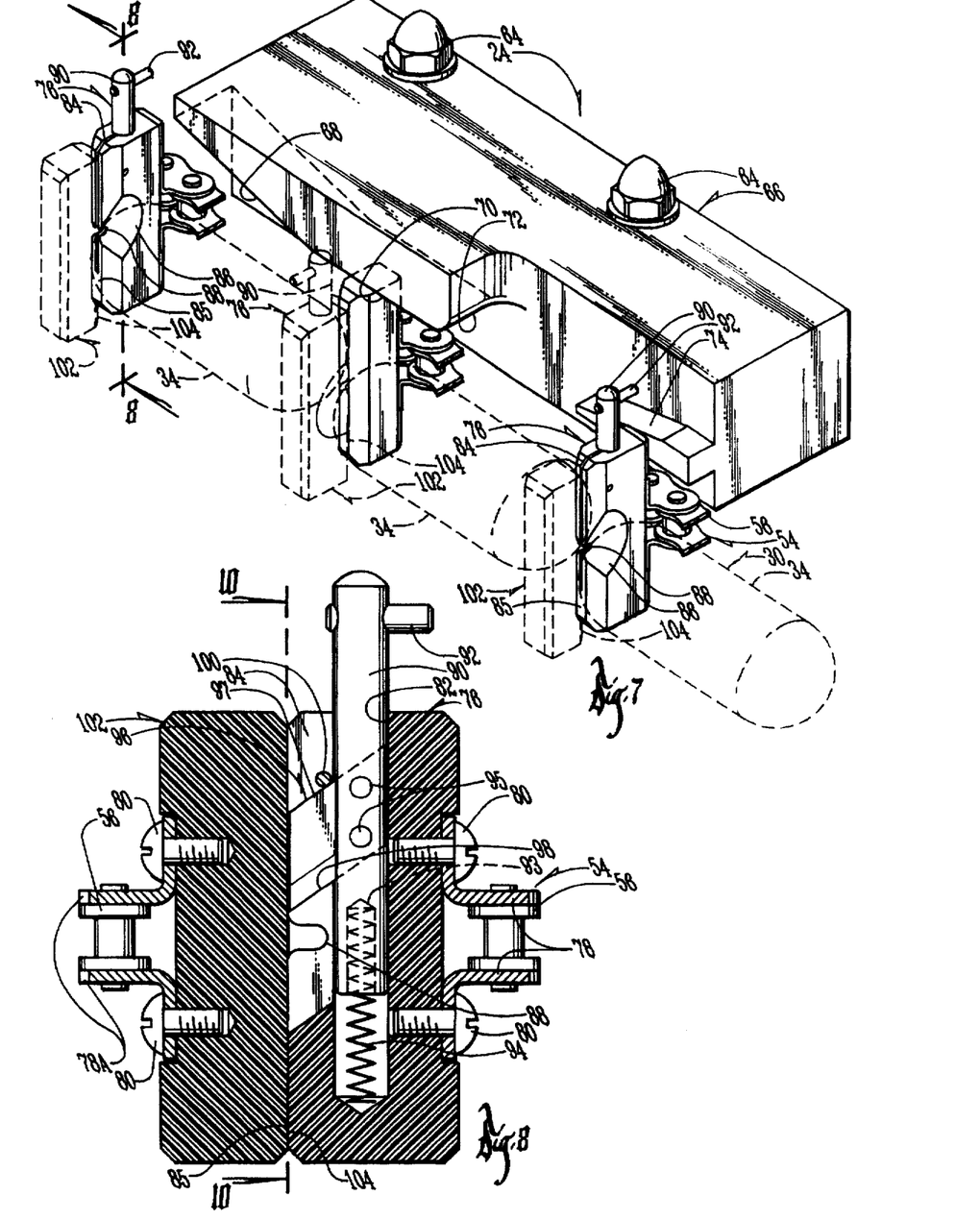
FIG. 7 is an enlarged scale perspective view of a cam block and the cutting blocks mounted on one of the linking chains.
FIG. 8 is a sectional view taken on line 8—8 of FIG. 7.

With reference to FIG. 3, a support block 62 is secured to plate 36 and two pairs of cam posts 64 extend upwardly therefrom. A cam block 66 is secured to the upper ends of each of the pairs of cam posts 64. With reference to FIG. 7, each cam block 66 has a cutting cam surface 68 which extends downwardly and forwardly from the upstream end of the cam block. Cam surface 68 terminates in a horizontal cam surface 70 which in turn terminates at the shoulder 72 of the cam block. Spaced downstream from shoulder 72 is a blade back up cam surface 74 which extends upwardly and forwardly with respect to the upstream end of the cam block.

With reference to FIGS. 8 and 9, a plurality of spaced cutting blocks 76 are mounted on the chains 54 by means of clips 78 and bolts 80. Cutting block 76 has a vertical bore 82 extending downwardly therein and a laterally extending vertical slot 84 which extends laterally from bore 82 to the outer vertical surface 85 of the block. A conical surface 86 is formed on opposite sides of the blocks 76, and a centrally located notch 88 is cut and each is formed in surface 86. Notch 88 is open on one side thereof and communicates with the surface 85 of the block.

An elongated plunger 90 has a blade slot 91 with a horizontal cam pin 92 laterally extending from the upper end thereof. A spring bore 93 is formed in the lower end of plunger 90 to receive one end of compression spring 94. A pair of blade pins 95 extend through plunger 90 and the blade slot 91 to secure blade 96 within the slot 91. Blade 96 has a top edge 97 and a lower cutting edge 98 which forms an angle of approximately 35 degrees with respect to the longitudinal axis of the plunger 90. A retainer pin 100 extends horizontally through block 76 and prevents the plunger 90 from being forced upwardly and out of the bore 82. The upward movement of plunger 90 in bore 82 is limited by reason of retainer pin engaging the top edge 97 of the blade as best shown in FIG. 8.

A retainer block 102 which is rectangular in shape is secured by clips 78 to the chains 54 by means of clips 78A which are identical to clip 78 previously described. The retainer blocks 102 have a flat inner surface 104 (FIG. 8) to register with the surface 85 of block 76.

Figure 11:
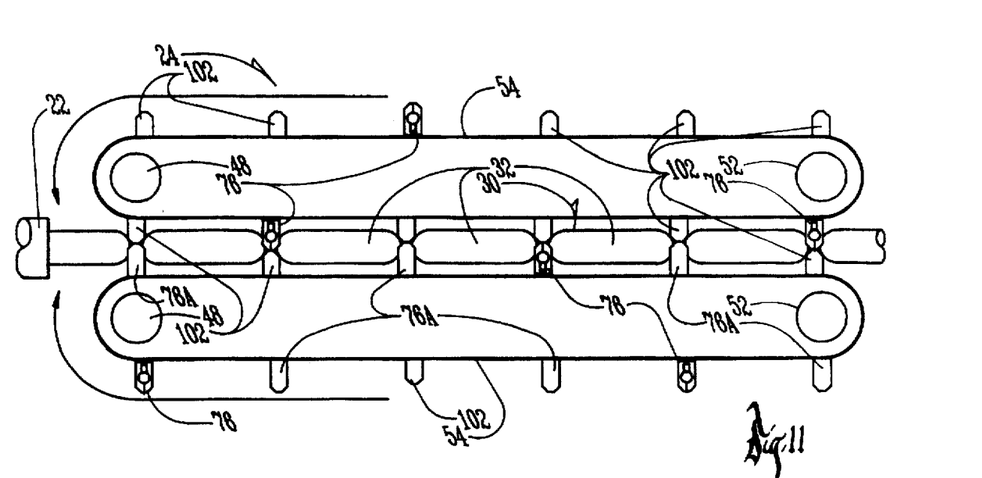
FIG. 11 is a schematic plan view at a reduced scale showing an arrangement of blocks on the linking chains to create a sausage rope being cut at the ends of two separate sausage members.

It should be noted that the cutting block 76 and the retainer block 102 are mounted on the two chains 54 in such a way that one of the cutting blocks 76 always registers with a retainer block 102 when the portions 56 of each chain are opposite to each other. Clips 55 guide sausage rope 30 between parallel opposite segments 56 of chains 54. (FIG. 2.) It is also desirable that the cutting blocks be intermittently positioned between retainer blocks as shown in FIG. 7 so that all of the cutting blocks are not positioned on just one side of sausage rope 30. The arrangement of blocks 76 and 102 as shown in FIG. 7 are arranged to cut the link 32 appearing at each end of the sausage members 34. However, it is often desirable to have two sausage members connected together with an uncut link. FIG. 11 shows an arrangement of blocks 76 and 102 to accomplish this result. The blocks 76A are like blocks 76 except that they do not contain plunger 90, spring 94 and blade 96. The link 32 is not cut when block 76A registers with a block 102. Obviously, the blocks 76, 76A and 102 could be arranged in even further ways to create segments of the sausage rope comprised of even more than two sausage members.

In operation, meat emulsion is pumped through horn 20 and into casing 28 within rotating chuck 22 which imparts rotational motion to the sausage rope 30. This phenomenon is entirely conventional and is not of itself a part of this invention.

With reference to FIG. 2, when the block 76 registers with the block 102 at the left-hand end of FIG. 2, the sausage rope 30 is pinched and its rotational motion downstream from the registering blocks is stopped so that the link 32 comprised of several twists of the sausage rope is created within notches 88. The longitudinal movement of the sausage rope 30 is not interrupted while the first link 32 is being formed.

As the link 32 described above moves longitudinally between portions 56 of the chains 54, the link ultimately moves underneath the cam blocks 66. As the retainer block 102 passes under one of the cam blocks 66, no cutting action results because the retainer blocks 102 do not coact with the cam blocks 66 to create any cutting action. However, regardless of whether the cutting block 76 is on one of the linking chains or the other, it will pass under at least one of the cam blocks 66. The top surface on plunger 90 will engage the cutting cam surface 68 which will force the plunger 90 downwardly against spring 94 which in turn will cause the blade 96 to move downwardly in slot 84. As soon as the cutting edge 98 passes through the notches 88, the link 32 will be severed.

As soon as the top of plunger 90 clears shoulder 72 on cam block 66, spring 94 will force the plunger 90 and cutting blade 96 in an upwardly direction to a non-cutting position. In the remote event that debris prevents the spring 94 from pushing the plunger 90 upwardly, the pin 92 will engage the blade back up cam surface 74 which will force the plunger 90 in an upward direction.

It is seen that the foregoing structure will permit a sausage rope to be linked and cut while the sausage rope is in continuous longitudinal movement. The device is extremely versatile in that it can create a continuously linked sausage rope by using only blocks 102 and cutting blocks 76A without a blade therein. More importantly, the cutting blocks 76 can be so arranged as described above to sever the links at opposite ends of every sausage member, or can be used in a second mode to allow two or more sausage members to be linked together with only the resulting groups of sausage members being severed from each other (e.g. FIG. 11).

From the foregoing, it is seen that this invention will accomplish at least all of its stated objectives.

What is claimed is:

1. A machine for linking and separating encased sausages, comprising, a frame, a meat extrusion assembly on said frame for extruding meat emulsion into an elongated casing tube to create a sausage rope, and means for rotating said sausage rope, a linking and link cutting assembly on said frame located downstream from said meat extrusion assembly, and comprising a pair of continuous elongated carrier chains rotatably mounted on said frame so that a portion of each carrier chain can move horizontally longitudinally in spaced parallel relationship to a like portion of the other carrier chain, means on said frame for rotating said carrier chains in a horizontal plane, linking elements on said carrier chains to form spaced links with twists therebetween on said rope, block elements mounted on said carrier chains which are equally spaced so that block elements on each carrier chain will register with each other along the portions of the carrier chains that move longitudinally and parallel to each other to abut each other at said twists in said rope, and a link cutter on said frame and being movable with at least one block element of one pair of registering block elements, said link cutter including a cam-operated cutting blade vertically movable with respect to said horizontal plane, and a cam element on said frame for engaging said cutting blade to cut said sausage rope at one of said twists between said registered block elements while said registered block elements are being moved by said carrier chains.

2. The machine of claim 1 wherein said link cutter is a part of one of said block elements.

3. The machine of claims 1 wherein at least one of said block elements on one of said carrier chains has longitudinally opposed conical surfaces with a centrally located laterally open notch to received one of said twists in said sausage rope.

4. The machine of claim 3 wherein cutting blade therein is positioned in one of said block elements to cut said twist extending through said notch while said carrier chains are moving.

5. The machine of claim 4 wherein said cutting blade is engagable with a cam element extending parallel to the movement of said block elements on said frame to cause said blade to move to cut said twist.

6. The machine of claim 5 wherein said blade is spring loaded to a position away from a position to cut said twist.

7. The machine of claim 1 wherein said carrier chains have a plurality of block elements longitudinally spaced thereon and having link cutters as a part thereof.

8. The machine of claim 1 wherein said carrier elements have a plurality of block elements having link cutters as a part thereof with at least a pair of registered block elements therebetween which have no link cutters therein.

9. A linking and link cutting assembly for sausage encasing machines, comprising, a support plate, a pair of continuous elongated carrier chains rotatably mounted on said plate so that a portion of each carrier chain can move horizontally longitudinally in spaced parallel relationship to a like portion of the other carrier chain, means on said plate for rotating said carrier chains in a horizontal plane, linking elements on said carrier chains to form spaced sausage links with twists therebetween block elements mounted on said carrier chains and being equally spaced so that block elements on each carrier chain will register with each other along the portions of the carrier elements that move longitudinally and parallel to each other to abut each other laterally adjacent said twists and surround said twists in a vertical plane, and a link cutter on said plate and being movable with at least one block element of one pair of registering block elements, said link cutter including a cam-operated cutting blade vertically movable with respect to said horizontal plane, and a cam element on said frame for engaging said cutting blade to cut a sausage rope at one of said twists between said block elements while said registered block elements are being moved by said carrier chains.

10. The device of claim 9 wherein said link cutter is a part of one of said blocks.

11. The device of claim 9 wherein at least one of said blocks on one of said carrier elements has longitudinally opposed conical surfaces with a centrally located laterally open notch to receive the link in said sausage rope.

12. The device of claim 11 wherein said one of said blocks has a movable cutting blade therein to cut said link extending through said notch while said carrier elements are moving.

13. The device of claim 12 wherein said cutting blade is engagable with a cam element on said plate to cause said blade to move to cut said link plate, the cam member extending parallel to the movement of said block elements.

14. The device of claim 13 wherein said cutting blade is operatively connected to a cam element to move said cutting blade towards and away from a position to cut said link.

15. The device of claim 14 wherein said blade is spring loaded to a position away from a position to cut said link.

16. The device of claim 11 wherein said one of said blocks is registered with a block of rectangular construction which holds said link in said notch.

17. The device of claim 9 wherein said carrier elements have a plurality of blocks having link cutters as a part thereof.

18. The device of claim 9 wherein said carrier elements have a plurality of blocks having link cutters as a part thereof with at least a pair of registering blocks therebetween which have no link cutters therein.

19. The machine of claim 1 wherein a cam member for each carrier element is mounted on said frame to operate a link cutter mounted on each carrier element.

20. The device of claim 9 wherein a cam member for each carrier element is mounted on said plate to operate a link cutter mounted on each carrier element.

* * * * *